United States Patent
Dishman et al.

(10) Patent No.: US 7,956,579 B2
(45) Date of Patent: Jun. 7, 2011

(54) BATTERY CHARGE MANAGEMENT SYSTEM FOR CHARGING A BATTERY BANK THAT INCLUDES A PLURALITY OF BATTERIES

(75) Inventors: Cecil C. Dishman, Raleigh, NC (US); Eino A. Lindfors, Wake, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 11/960,615

(22) Filed: Dec. 19, 2007

(65) Prior Publication Data

US 2009/0160401 A1    Jun. 25, 2009

(51) Int. Cl.
*H02J 7/00* (2006.01)
(52) U.S. Cl. ......... 320/119; 320/104; 320/120; 320/124
(58) Field of Classification Search .................. 320/104, 320/119, 120, 124, 116, 123
See application file for complete search history.

(56) References Cited

U.S. PATENT DOCUMENTS

| | | | |
|---|---|---|---|
| 4,118,661 A | 10/1978 | Siekierski et al. | |
| 5,399,909 A * | 3/1995 | Young | 307/65 |
| 5,498,950 A * | 3/1996 | Ouwerkerk | 320/119 |
| 5,757,163 A | 5/1998 | Brotto et al. | |
| 5,850,136 A | 12/1998 | Kaneko | |
| 5,923,148 A | 7/1999 | Sideris et al. | |
| 5,998,966 A | 12/1999 | Gaza | |
| 6,586,909 B1 | 7/2003 | Trepka | |
| 2004/0104709 A1* | 6/2004 | Yamaji et al. | 320/150 |
| 2008/0258683 A1* | 10/2008 | Chang | 320/112 |

* cited by examiner

*Primary Examiner* — Edward Tso
*Assistant Examiner* — Arun Williams
(74) *Attorney, Agent, or Firm* — Steven L. Bennett; Biggers & Ohanian, LLP (57) ABSTRACT

Battery charge management systems for charging a battery bank including a plurality of batteries connected in series are disclosed that include: a power source having a charging port, the power source capable of providing power to each battery in the battery bank; a multiplexer connected to the battery bank, the multiplexer capable of connecting the charging port to a single battery at a time and capable of switching the connection of the charging port to each battery in the battery bank; and a microcontroller connected to the multiplexer and operatively coupled to each battery in the battery bank, the microcontroller capable of receiving discharge data and charge data for each battery in the battery bank, the microcontroller capable of instructing the multiplexer to switch the connection of the charging port with each battery in dependence upon the discharge data and the charge data for that battery.

15 Claims, 7 Drawing Sheets

FIG. 7

BATTERY CHARGE MANAGEMENT SYSTEM FOR CHARGING A BATTERY BANK THAT INCLUDES A PLURALITY OF BATTERIES

BACKGROUND OF THE INVENTION

1. Field of the Invention

The field of the invention is battery charge management systems for charging a battery bank that includes a plurality of batteries.

2. Description of Related Art

The demand for clean energy has risen rapidly in recent years, especially energy provided through rechargeable batteries. As a result, rechargeable batteries are being used in more and more applications to provide power to automobiles, tools, electronics, computers, homes, and so on. The rapid increase in rechargeable battery uses has accordingly increased the need for rapid and efficient battery chargers.

In many applications, a load using battery power may require more power than typically is provided by a single battery. In such applications, the load is often provided power through use of a battery bank composed of a plurality of batteries that are connected together in series. Because multiple batteries are connected in series in a battery bank, the battery bank is able to provide the load with power at a higher voltage than is generally capable of being supplied by a single battery.

Current battery chargers typically operate to charge a battery bank either by simultaneously charging all of the batteries in the bank in series using a single charging port or by charging each of the batteries in the bank simultaneously using multiple charging ports. The drawback to simultaneously charging all of the batteries in the bank in series using a single charging port is that some of the batteries may be overcharged if other batteries in the bank are not charged to their full capacities, thereby resulting in the entire battery bank becoming defective. The drawback to charging each of the batteries in the bank simultaneously using multiple charging ports is that implementing such a battery charger is quite costly because each battery requires its own charging port, which typically requires a separate transformer winding and voltage regulator. In addition, such battery chargers typically charge each of the batteries until the product of the voltage and the current for that battery reaches a certain threshold without accounting for any individual characteristics of the battery. Because individual battery characteristics are not utilized in charging the batteries, often batteries do not receive a full charge.

SUMMARY OF THE INVENTION

Battery charge management systems for charging a battery bank including a plurality of batteries connected in series are disclosed that include: a power source having a charging port, the power source capable of providing power to each battery in the battery bank; a multiplexer connected to the battery bank, the multiplexer capable of connecting the charging port to a single battery at a time and capable of switching the connection of the charging port to each battery in the battery bank; and a microcontroller connected to the multiplexer and operatively coupled to each battery in the battery bank, the microcontroller capable of receiving discharge data and charge data for each battery in the battery bank, the microcontroller capable of instructing the multiplexer to switch the connection of the charging port with each battery in dependence upon the discharge data and the charge data for that battery.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
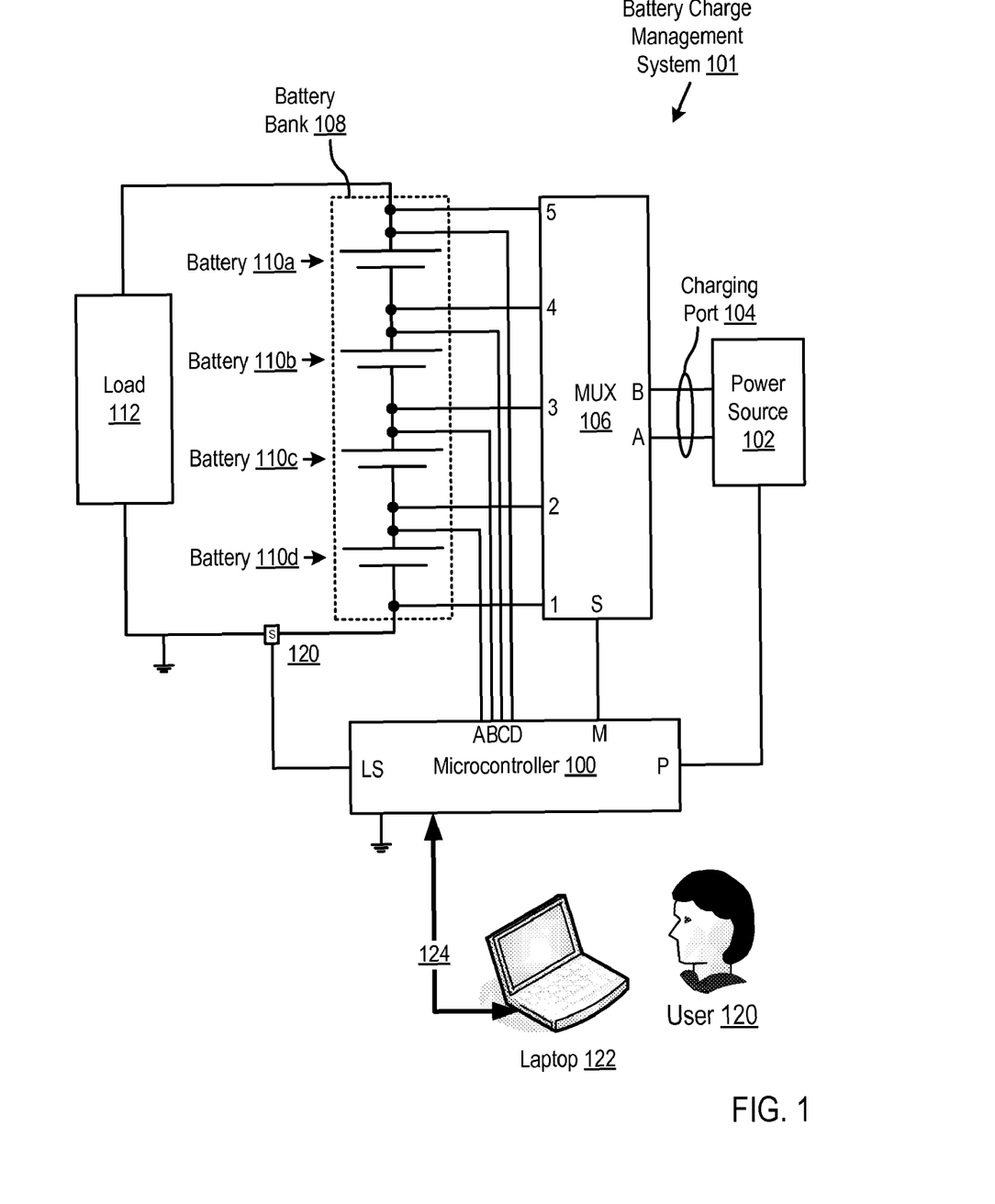
FIG. 1 sets forth a circuit diagram illustrating an exemplary battery charge management system for charging a battery bank according to embodiments of the present invention.

Exemplary battery charge management systems for charging a battery bank and methods of charging a battery bank that includes a plurality of batteries connected in series according to embodiments of the present invention are described with reference to the accompanying drawings, beginning with FIG. 1. FIG. 1 sets forth a circuit diagram illustrating an exemplary battery charge management system (101) for charging a battery bank (108) according to embodiments of the present invention. The battery bank (108) of FIG. 1 includes a plurality of batteries (110) connected together in series to provide power to load (112). Each battery (110) of FIG. 1 is composed of one or more battery cells and may be implemented using any number of technologies as will occur to those of skill in the art such as, for example, Lead-Acid, Lithium Ion, Nickel-cadmium battery ('NiCd'), Nickel-metal hydride battery ('NiMH'), and other as will occur to those of skill in the art. The batteries (110) are connected together in series in that the batteries (110) are cascaded or daisy-chained together so that the current for each battery (110) is the same.

The exemplary battery charge management system (101) of FIG. 1 includes a power source (102) capable of providing power to each battery (110) in the battery bank (108). The power source (102) of FIG. 1 may be implemented as a constant current source or a constant voltage source depending on the battery chemistry of the batteries (110) being charged. For example, when the batteries are implemented as Lead-Acid batteries, the power source (102) may be implemented as a constant current source. When the batteries are implemented as Lithium Ion batteries, the power source (102) may be implemented as a constant voltage source. In the example of FIG. 1, the power source (102) of FIG. 1 has a charging port (104). The charging port (104) of FIG. 1 is composed of two terminals used to supply power at a constant voltage or constant current to each of the batteries (110).

The exemplary battery charge management system (101) of FIG. 1 also includes a multiplexer (106) connected to the battery bank (108) and the power source (102). The multiplexer (106) of FIG. 1 is capable of connecting the charging port (104) of the power source (102) to a single battery at a time and is capable of switching the connection of the charging port (104) to each battery (110) in the battery bank (108). For example, consider that the multiplexer (106) of FIG. 1 receives power from the charging port (104) of the power source (102) through terminals A and B. The multiplexer (106) may connect the charging port (104) to battery (110d) by connecting terminals A and B to terminals 1 and 2. Similarly, the multiplexer (106) may connect the charging port (104) to battery (110c) by connecting terminals A and B to terminals 2 and 3. The multiplexer (106) may connect the charging port (104) to battery (110b) by connecting terminals A and B to terminals 3 and 4. The multiplexer (106) may connect the charging port (104) to battery (110a) by connecting terminals A and B to terminals 4 and 5. In the example of FIG. 1, the multiplexer (106) connects the charging port (104) to one of the batteries (110) based on the signal received in the multiplexer (106) from a microcontroller (100) at terminal S.

In the example of FIG. 1, the battery charge management system (101) includes a microcontroller (100) connected to the multiplexer (106) and operatively coupled to each battery (110) in the battery bank (108). The microcontroller (100) connects to the multiplexer (106) through terminal M in FIG. 1. The microcontroller (100) connects to the battery (110d) through terminal A, connects to the battery (110c) through terminal B, connects to the battery (110b) through terminal C, and connects to the battery (110a) through terminal D. The microcontroller's connection to each battery (110) may be a connection to a voltage or current sensor of each battery (110). In other embodiments, the microcontroller's connection to each battery (110) may be a connection to each battery's own microcontroller, which in turn monitors the voltage and current for that battery and communicates with the microcontroller (100).

Through the microcontroller's connection to each battery (110), the microcontroller (100) of FIG. 1 is capable of receiving discharge data and charge data for each battery (110) in the battery bank (108). The discharge data for each battery (110) represents energy dissipated from that battery during a discharge time period. A discharge time period is the period of time in which the battery bank (108) supplies power to the load (112) and is not being charged by the power source (102). The charge data for each battery (110) represents energy supplied to that battery during a charge time period. A charge time period is the period of time in which the battery bank (108) is being charged by the power source (102) and does not supply power to the load (112). In the example of FIG. 1, the microcontroller (100) controls whether the battery bank (108) is connected to the load (112) through a switch (120), which is operated by the signal provided by the microcontroller (100) on the microcontroller's LS terminal.

In the example of FIG. 1, the microcontroller (100) is capable of instructing the multiplexer (106) to switch the connection of the charging port (104) with each battery (110) in dependence upon the discharge data and the charge data for that battery (110). In particular, the microcontroller (100) of FIG. 1 may instruct the multiplexer (106) to switch the connection of the charging port (104) from one particular battery to another when the total energy supplied to that battery during a charge time period matches the total energy dissipated from that battery during a discharge time period as indicated by the charge data and the discharge data. The manner in which the microcontroller (100) calculates the total energy supplied to that battery during a charge time period using the charge data and the manner in which the microcontroller (100) calculates the total energy dissipated from that battery during a discharge time period using the discharge data may vary from one embodiment to another depending on the implementation of the charge data and the discharge data.

For further explanation of calculating the energy dissipated from the battery during the discharge time period using the discharge data, consider that discharge data is implemented as voltage and current values for each second of the discharge time period. To calculate the energy dissipated from the battery during the discharge time period, the microcontroller (100) may add the product of the voltage and the current for that battery for each second of the discharge time period. For example, consider the following table illustrating exemplary discharge data for an exemplary battery over an exemplary discharge time period:

TABLE 1

| TIME (SECONDS) | DISCHARGE DATA | | | TOTAL ENERGY DISSIPATED (JOULES) |
| | VOLTAGE (VOLTS) | CURRENT (AMPERES) | WATT · SECONDS (JOULES) | |
| --- | --- | --- | --- | --- |
| 1 | 12 | 2 | 24 | 24 |
| 2 | 12 | 2 | 24 | 48 |
| 3 | 12 | 2 | 24 | 72 |
| 4 | 11.9 | 1.9 | 22.6 | 94.6 |
| 5 | 11.9 | 1.9 | 22.6 | 117.2 |
| 6 | 11.9 | 1.9 | 22.6 | 139.8 |
| 7 | 11.8 | 1.8 | 21.2 | 161 |
| 8 | 11.8 | 1.8 | 21.2 | 182.2 |
| . . . | . . . | . . . | . . . | . . . |

Table 1 above illustrates that 1 second after the beginning of the discharge time period, the microcontroller received discharge data specifying that 24 Joules of energy were dissipated from the exemplary battery over the previous 1 second, yielding a total energy dissipation of 24 Joules over the entire 1 second discharge time period. Four seconds after the beginning of the discharge time period, the microcontroller received discharge data specifying that 22.6 Joules of energy were dissipated from the exemplary battery over the previous 1 second, yielding a total energy dissipation of 94.6 Joules over the entire 4 second discharge time period. Seven seconds after the beginning of the discharge time period, the microcontroller received discharge data specifying that 21.2 Joules of energy were dissipated from the exemplary battery over the previous 1 second, yielding a total energy dissipation of 161 Joules over the entire 7 second discharge time period. Readers will note that the exemplary discharge data illustrated in the table above is for explanation and not for limitation.

At the end of the discharge time period, the microcontroller (100) of FIG. 1 may aggregate the total energy dissipated from each of the batteries (110) in a battery charge table for use during the charge time period to determine when to stop charging one battery and switch to another battery. For example, consider the following exemplary battery charge table:

TABLE 2

EXEMPLARY BATTERY CHARGE TABLE

| BATTERY ID | TOTAL ENERGY DISSIPATED (JOULES) | TOTAL ENERGY SUPPLIED (JOULES) |
|---|---|---|
| 110a | 100,000 | — |
| 110b | 120,000 | — |
| 110c | 100,000 | — |
| 110d | 80,000 | — |

The exemplary battery charge table above indicates that the total energy dissipated from battery (110a) during the discharge time period was 100,000 Joules. The total energy dissipated from battery (110b) during the discharge time period was 120,000 Joules. The total energy dissipated from battery (110c) during the discharge time period was 100,000 Joules. The total energy dissipated from battery (110d) during the discharge time period was 80,000 Joules. Readers will note that the exemplary battery charge table illustrated above is for explanation and not for limitation.

During the charge time period, the microcontroller (100) selects one of the batteries (110) for charging and calculates the total energy supplied to the battery during the charge time period using the charge data for that battery. For further explanation of calculating the total energy supplied to the battery during the charge time period using the charge data, consider that charge data is implemented as voltage and current values for each second of the charge time period. To calculate the energy supplied to the battery during the charge time period, the microcontroller (100) may add the product of the voltage and the current for that battery for each second of the charge time period. For example, consider the following table illustrating exemplary charge data for an exemplary battery over an exemplary charge time period:

TABLE 3

| | CHARGE DATA | | | TOTAL |
|---|---|---|---|---|
| TIME (SECONDS) | VOLTAGE (VOLTS) | CURRENT (AMPERES) | WATT·SECONDS (JOULES) | ENERGY SUPPLIED (JOULES) |
| 1 | 1 | 2 | 2 | 2 |
| 2 | 1 | 2 | 2 | 4 |
| 3 | 1 | 2 | 2 | 6 |
| 4 | 1.1 | 2 | 2.2 | 8.2 |
| 5 | 1.1 | 2 | 2.2 | 10.4 |
| 6 | 1.1 | 2 | 2.2 | 12.6 |
| 7 | 1.2 | 2 | 2.4 | 13.0 |
| 8 | 1.2 | 2 | 2.4 | 15.4 |
| ... | ... | ... | ... | ... |

Table 3 above illustrates that 1 second after the beginning of the charge time period, the microcontroller received charge data specifying that 2 Joules of energy were supplied the exemplary battery over the previous 1 second, resulting in a total energy supplied of 2 Joules over the entire 1 second charge time period. Four seconds after the beginning of the charge time period, the microcontroller received discharge data specifying that 2.2 Joules of energy were supplied to the exemplary battery over the previous 1 second, resulting in a total energy supplied of 8.2 Joules over the entire 4 second charge time period. Seven seconds after the beginning of the charge time period, the microcontroller received charge data specifying that 2.4 Joules of energy were supplied to the exemplary battery over the previous 1 second, resulting in a total energy supplied of 13 Joules over the entire 7 second charge time period. Readers will note that the exemplary charge data illustrated in the table above is for explanation and not for limitation. Readers will further note that the microcontroller may store the total energy supplied to each battery in a battery charge table such as, for example, the exemplary battery charge table 2 above.

As mentioned above, the microcontroller (100) of FIG. 1 may instruct the multiplexer (106) to switch the connection of the charging port (104) from one battery to another when the energy supplied to that battery during a charge time period matches the energy dissipated from that battery during a discharge time period. As such, each second of the charge time period for a particular battery, the microcontroller (100) of FIG. 1 may compare the total energy supplied to that battery with the total energy dissipated from that battery during the discharge time period as indicated in Table 2 above. When the value of the total energy supplied to that battery reaches the value of the total energy dissipated from that battery during the discharge time period as indicated in Table 2 above, the microcontroller instructs the multiplexer (106) to switch the connection of the charging port (104) to another battery until all of the batteries are fully charged. For example, after the microcontroller (100) determines that the power source (102) has supplied battery (110d) with 80,000 Joules of energy, then the microcontroller (100) may instruct the multiplexer (106) to switch the connection with the charging port (104) to battery (110c) until the microcontroller (100) determines that the power source (102) has supplied 100,000 Joules of energy to battery (110c).

Readers will note that the batteries are not typically one hundred percent efficient at storing the energy supplied during the charging time period. For example, some of the supplied electrical energy may be transformed into thermal energy. Readers will note that in some embodiments, therefore, the microcontroller (100) may supply additional energy to the battery beyond the total energy dissipated during the discharge time period based on an efficiency factor for each battery. Such an efficiency factor for each battery may be stored in the battery charge table along with the total energy dissipated from each battery during the discharge time period and with the total energy supplied to each battery during the charge time period.

In addition to receiving charge data and discharge data from each of the batteries (110), the microcontroller (100) of FIG. 1 is capable of receiving temperature data for each battery and sending a notification message to a user (120) if the temperature exceeds a predefined threshold. The notification message may specify a particular battery and that battery's current temperature. The microcontroller (100) may receive temperature data for each battery directly from a temperature sensor in each battery or from each battery's microcontroller. The predefined threshold may be implemented as a temperature value that indicates that a problem with the battery exists. For example, high battery temperatures may indicate that a battery connection is loose or that the battery contains a bad battery cell. The microcontroller (100) may send a notification message to a user through a data communication connection (124) with another computing device such as, for example, laptop (122). The data communication connection (124) may be implemented as, for example, a Universal Serial Bus ('USB') connection, an Inter-Integrated Circuit ('I²C') connection, a Joint Test Action Group ('JTAG') connection, an RS-232 connection, or any other communications connection as will occur to those of ordinary skill in the art.

Readers will note that in other embodiments the temperature data may be used for charging the batteries. For example, in Lead-Acid batteries the volts per cell voltage will vary with battery temperature. As such, the microcontroller may use the temperature for the batteries to determine the voltage level at which to charge the batteries.

The arrangement of components making up the exemplary battery charge management system (101) illustrated in FIG. 1 are for explanation, not for limitation. Battery charge management system useful according to various embodiments of the present invention may include additional components, hardware, software, data communications buses, or other computer architectures, not shown in FIG. 1, as will occur to those of skill in the art.

The description above with reference to FIG. 1 describes charging the batteries in a battery bank individually, one at a time. When the battery bank contains a large number of batteries, charging each battery individually may require large amount of time. In some embodiments, therefore, a battery charge management system according to embodiments of the present invention may charge all of the batteries together for the first portion of the charge time period and then charge the batteries individually for the remaining portion of the charge time period. For further explanation, therefore, consider FIG. 2 that sets forth a circuit diagram illustrating a further exemplary battery charge management system (101) for charging a battery bank according to embodiments of the present invention.

Figure 2:
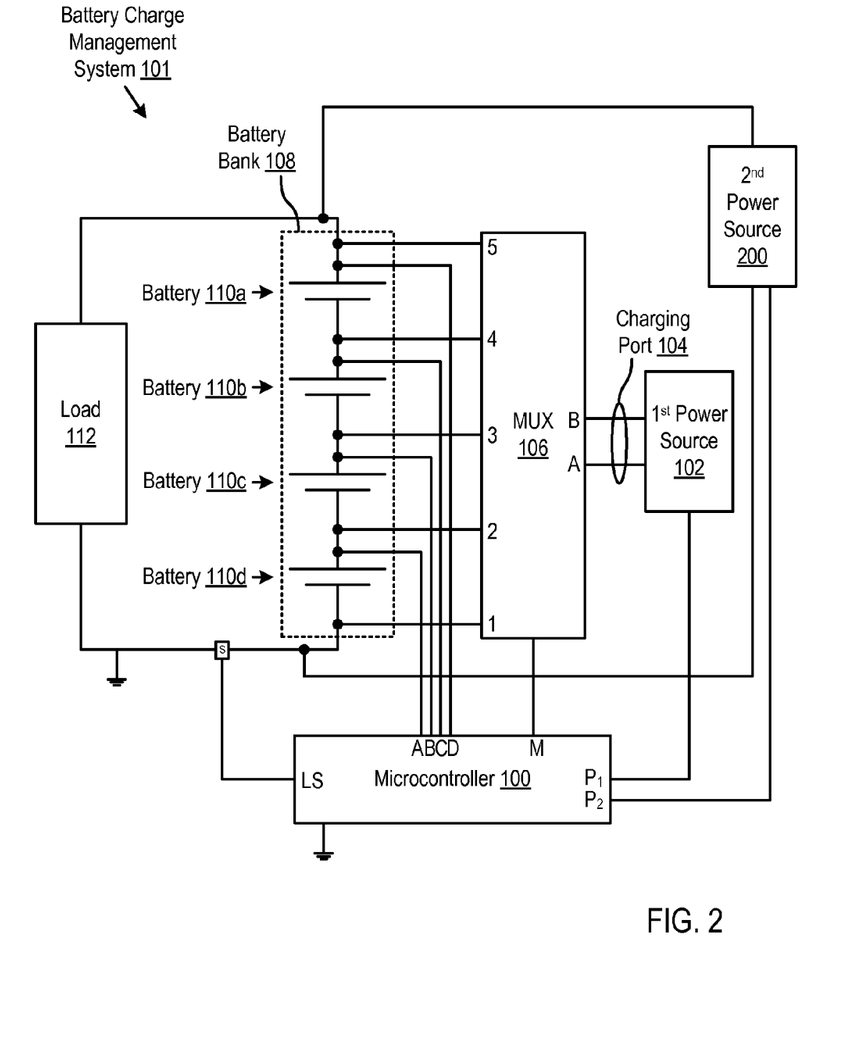
FIG. 2 sets forth a circuit diagram illustrating a further exemplary battery charge management system for charging a battery bank according to embodiments of the present invention.

The battery charge management system (101) of FIG. 2 is similar to the battery charge management system of FIG. 1. The battery charge management system (101) of FIG. 2 includes a power source (102) having a charging port (104). The power source (102) of FIG. 2 is capable of providing power to each battery (110) in the battery bank (108). The battery charge management system (101) of FIG. 2 includes a multiplexer (106) connected to the battery bank (108). The multiplexer (106) is capable of connecting the charging port (104) to a single battery at a time and capable of switching the connection of the charging port (104) to each battery (110) in the battery bank (108). The battery charge management system (101) of FIG. 2 also includes a microcontroller (100) connected to the multiplexer (106) and operatively coupled to each battery (110) in the battery bank (108). The microcontroller (100) is capable of receiving discharge data and charge data for each battery (110) in the battery bank (108) and is capable of instructing the multiplexer (106) to switch the connection of the charging port (104) with each battery (110) in dependence upon the discharge data and the charge data for that battery (110).

In the battery charge management system (101) of FIG. 2, the power source (102) is a first power source. The battery charge management system (101) includes a second power source (200) capable of providing power to each of the batteries (110) in the battery bank (108) simultaneously in series. Because the second power source (200) provides power to the batteries (110) in the battery bank (108) simultaneously and the first power source (102) only provides power to one battery at a time through the multiplexer (106), the second power source (200) typically provides power at a higher voltage that than the first power source (102).

The microcontroller (100) of FIG. 2 initially charges the battery bank (108) in series during the first portion of the charge time period using the second power source (200). The microcontroller (100) charges the battery bank (108) in series using the second power source (200) by disconnecting the load (112) from the battery bank (108) using a switch connected to terminal LS, turning off the first power source (102) using a signal transmitted from terminal $P_1$, and turning on the second power source (200) using a signal transmitted from terminal $P_2$.

While the battery bank (108) is charged in series using the second power source (200), the microcontroller (100) of FIG. 2 receives charge data from each of the batteries (110) in the battery bank (108). In particular, the microcontroller (100) receives charge data from battery (110d) in terminal A of the microcontroller (100). The microcontroller (100) of FIG. 2 receives charge data from battery (110c) in terminal B of the microcontroller (100). The microcontroller (100) of FIG. 2 receives charge data from battery (110b) in terminal C of the microcontroller (100). The microcontroller (100) of FIG. 2 receives charge data from battery (110a) in terminal D of the microcontroller (100).

In the example of FIG. 2, the microcontroller (100) is capable of determining whether the charge data and discharged data received from each battery (110) in the battery bank (108) satisfy series charging termination criteria. Series charging termination criteria specifies when the battery charge management system (101) switches from simultaneously charging all of the batteries (110) in series using the second power source (200) to individually charging each battery (110) using the first power source (102). For example, series charging termination criteria may specify that switching from simultaneously charging all of the batteries (110) in series to individually charging each battery (110) occurs when the charge data for one of the batteries (110) exceeds the discharge data for that battery (110), when the charge data for one of the batteries (110) exceeds the discharge data for that battery (110) by a predetermined threshold, or when the charge data for one of the batteries (110) reaches a predetermined threshold below the discharge data for that battery (110). For further example, series charging termination criteria may specify that switching from simultaneously charging all of the batteries (110) in series to individually charging each battery (110) occurs when a predefined percentage of the total theoretical voltage for the entire battery bank (108) is reached.

To switch from simultaneously charging all of the batteries (110) in series using the second power source (200) to individually charging each battery (110) using the first power source (102), the microcontroller (100) of FIG. 2 is capable of connecting the second power source (200) to the battery bank (108) in series if the charge data received from each battery (110) in the battery bank (108) does not satisfy series charging termination criteria, and capable of connecting the plurality of batteries (110) in the battery bank (108) to the first power source (102) if the charge data received from each battery (110) in the battery bank (108) satisfies series charging termination criteria. Simultaneously charging all of the batteries (110) in series using the second power source (200) before individually charging each battery (110) using the first power source (102) allows the battery charge management system (101) of FIG. 2 to charge the batteries (110) in the battery bank (108) faster than individually charging each battery (110) using the first power source (102) alone.

Although FIGS. 1 and 2 each illustrates a load powered by a single battery bank, in some embodiments, a load may be powered by more than battery bank. In turn, each of the battery banks may periodically be charged by a battery management system according to embodiments of the present invention. For further explanation, therefore, FIG. 3 sets forth a circuit diagram illustrating a further exemplary battery charge management system for charging a battery bank (108a) according to embodiments of the present invention. The battery bank (108a) is one battery bank among a plurality of battery banks (108) connected in parallel. The battery banks (108) are connected in parallel in that the battery banks (108) are electrically connected to have the same voltage across each of the banks (108).

Figure 3:
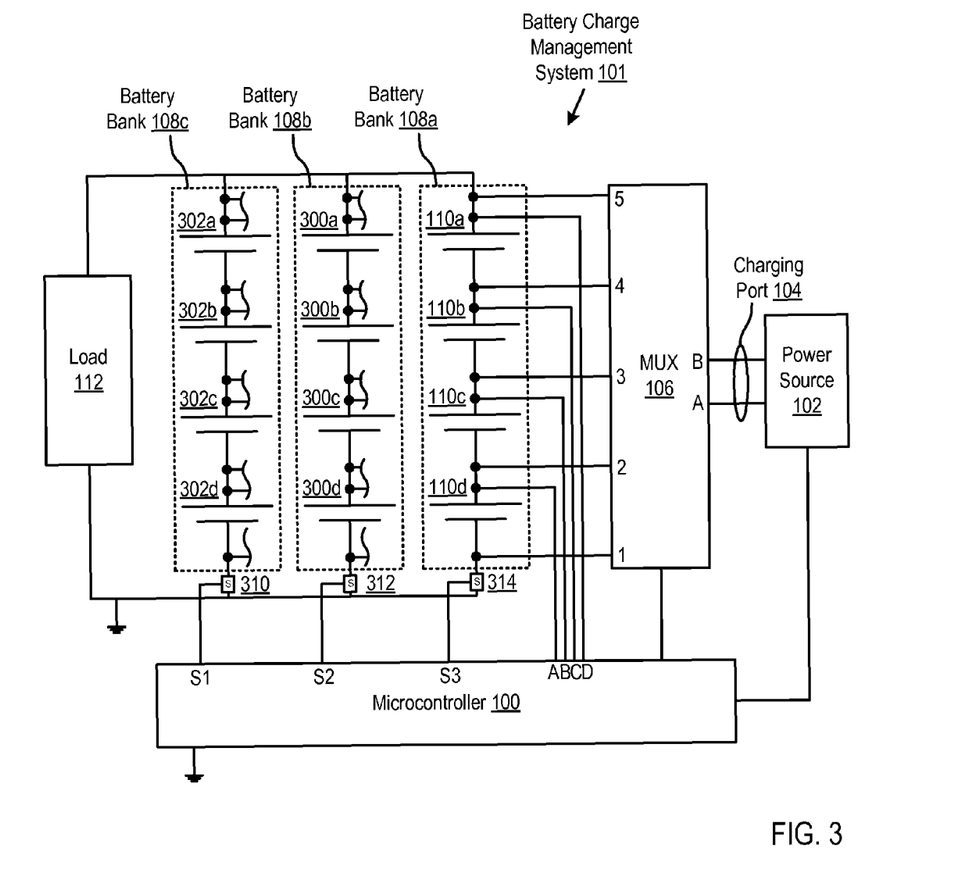
FIG. 3 sets forth a circuit diagram illustrating a further exemplary battery charge management system for charging a battery bank according to embodiments of the present invention.

Each battery bank (108) of FIG. 3 includes a plurality of batteries (110, 300, 302) connected in series. In particular, the battery bank (108a) includes plurality of batteries (110) connected in series. The battery bank (108b) includes plurality of batteries (300) connected in series. The battery bank (108c) includes plurality of batteries (302) connected in series.

In the example of FIG. 3, the multiplexer (106) is capable of connecting to a single battery bank (108) at a time. The multiplexer (106) may connect to a single battery bank (108) at a time through a bank of switches (not shown) that are controlled by the microcontroller (100). The microcontroller (100) of FIG. 3 is capable of selecting one of the plurality of battery banks (108) for charging, disconnecting the selected battery bank from the remaining battery banks, and switching the connection of the multiplexer (106) to the selected battery bank. The microcontroller (100) of FIG. 3 may disconnect the selected battery bank from the remaining battery banks using switches controlled by signals from terminals S1, S2, and S3. For example, the microcontroller (100) may disconnect battery bank (108b) from battery banks (108a, 108c) by issuing signals from terminals S1, S2, and S3 to close switch (310), open switch (312), and close switch (314). Readers will note that the ability to charge one battery bank at a time may be useful in situations where continuous power must be provided to the load (112). In such a manner, one battery bank may be taken offline to charge, while the load (112) is supported by the remaining battery banks.

With respect to each battery bank (108), the battery charge management system (101) of FIG. 3 is similar to the battery charge management system of FIG. 1. The battery charge management system (101) of FIG. 3 includes a power source (102) having a charging port (104). The power source (102) of FIG. 3 is capable of providing power to each battery (110) in each battery bank (108). The battery charge management system (101) of FIG. 3 includes a multiplexer (106) connected to each battery bank (108). The multiplexer (106) is capable of connecting the charging port (104) to a single battery at a time and capable of switching the connection of the charging port (104) to each battery (110) in the battery bank (108). The battery charge management system (101) of FIG. 3 also includes a microcontroller (100) connected to the multiplexer (106) and operatively coupled to each battery (110) in the battery bank (108). The microcontroller (100) is capable of receiving discharge data and charge data for each battery (110) in each battery bank (108) and is capable of instructing the multiplexer (106) to switch the connection of the charging port (104) with each battery (110) in dependence upon the discharge data and the charge data for that battery (110). Readers will note that the connections between the microcontroller (100) and each battery (300, 302) in battery banks (108b, 108c) are similar to the connections between the microcontroller (100) and each battery (110) in the battery bank (108a). Similarly, readers will note that the connections between the multiplexer (106) and each battery (300, 302) in battery banks (108b, 108c) are similar to the connections between the multiplexer (106) and each battery (110) in the battery bank (108a).

As mentioned above, methods of charging a battery bank that includes a plurality of batteries connected in series according to embodiments of the present invention described with reference to the accompanying drawings. For further explanation, FIG. 4 sets forth a flow chart illustrating an exemplary method of charging a battery bank that includes a plurality of batteries connected in series according to embodiments of the present invention.

Figure 4:
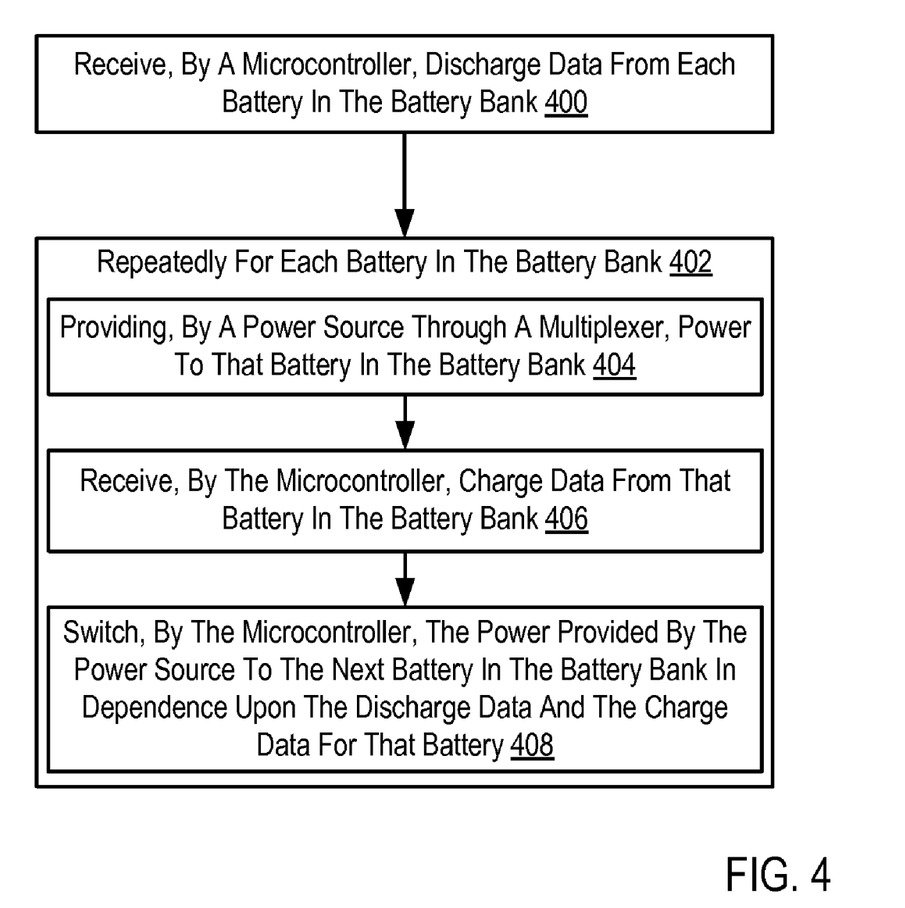
FIG. 4 sets forth a flow chart illustrating an exemplary method of charging a battery bank that includes a plurality of batteries connected in series according to embodiments of the present invention.

The method of FIG. 4 includes receiving (400), by a microcontroller, discharge data from each battery in the battery bank. As mentioned, above, the discharge data for each battery represents energy dissipated from that battery during a discharge time period. A discharge time period is the period of time in which the battery bank supplies power to the load and is not being charged by the power source. The microcontroller may receive (400) discharge data from each battery in the battery bank according to the method of FIG. 4 from sensors that supply the microcontroller with real-time voltage or current information for each battery. In other embodiments, each battery may have a dedicated microcontroller that is connected to the microcontroller of the battery charge management system. In such an example, the microcontroller may receive (400) discharge data from each battery in the battery bank according to the method of FIG. 4 from each battery's microcontroller.

The method of FIG. 4 also includes the following steps repeatedly (402) for each battery in the battery bank:
 providing (404), by a power source through a multiplexer, power to that battery in the battery bank;
 receiving (406), by the microcontroller, charge data from that battery in the battery bank; and
 switching (408), by the microcontroller, the power provided by the power source to the next battery in the battery bank in dependence upon the discharge data and the charge data for that battery.

In the method of FIG. 4, providing (404), by a power source through a multiplexer, power to a battery in the battery bank may be carried out by electrically connecting through the multiplexer a charging port for the power source to only a single battery at a time. The battery connected to the charge port at any given time through the multiplexer may be determined by the battery charge management system's microcontroller and provided to the multiplexer through the multiplexer's selection input terminals.

Receiving (406), by the microcontroller, charge data from each battery in the battery bank according to the method of FIG. 4 may be carried out by receiving the charge data using sensors that supply the microcontroller with real-time voltage or current information for each battery. The charge data for each battery represents energy supplied to that battery during a charge time period. A charge time period is the period of time in which the battery bank is being charged by the power source and does not supplies power to the load. In embodiments of the present invention in which each battery is managed by its own microcontroller, receiving (406), by the microcontroller, charge data from each battery in the battery bank according to the method of FIG. 4 may be carried out by receiving charge data from each battery's microcontroller.

In the method of FIG. 4, switching (408), by the microcontroller, the power provided by the power source to the next battery in the battery bank in dependence upon the discharge data and the charge data for that battery may be carried out by determining whether the energy supplied to the battery currently being charged during a charge time period matches the energy dissipated from that battery during a discharge time period. The microcontroller may determine when the energy supplied to a battery during a charge time period matches the energy dissipated from that battery during a discharge time period using the values for the charge data and the discharge data for that particular battery as described above with reference to FIG. 1.

The method of FIG. 4 describes charging batteries in a battery bank individually, one at a time. As mentioned above, however, when a large number of batteries are included in the battery bank, charging each battery individually may require large amount of time. In some embodiments, therefore, a battery charge management system according to embodiments of the present invention may charge all of the batteries together until the first battery is full and then charge the remaining batteries individually. For further explanation, consider FIG. 5 that sets forth a flow chart illustrating a further exemplary method of charging a battery bank that includes a plurality of batteries connected in series according to embodiments of the present invention.

Figure 5:
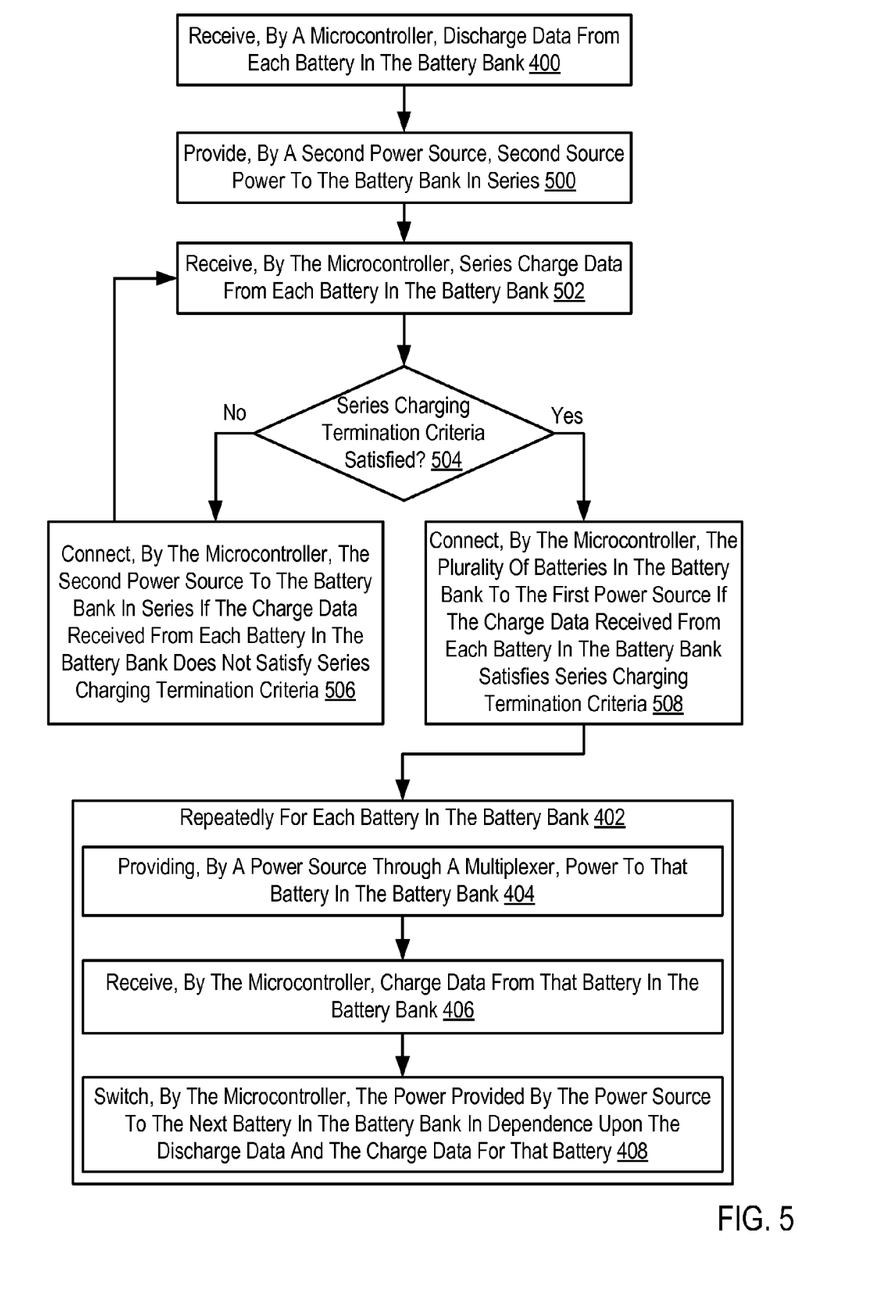
FIG. 5 sets forth a flow chart illustrating a further exemplary method of charging a battery bank that includes a plurality of batteries connected in series according to embodiments of the present invention.

The method of FIG. 5 includes receiving (400), by a microcontroller, discharge data from each battery in the battery bank. Receiving (400), by a microcontroller, discharge data from each battery in the battery bank according to the method of FIG. 5 may be carried out in the same manner described above with reference to the method of FIG. 4.

The method of FIG. 5 also includes providing (500), by a second power source, second source power to the battery bank in series. Providing (500), by a second power source, second source power to the battery bank in series according to the method of FIG. 5 may be carried out by electrically connecting the entire battery bank to a second power source using switches controlled by the charge management system's microcontroller.

The method of FIG. 5 includes receiving (502), by the microcontroller, series charge data from each battery in the battery bank. The series charge data for each battery represents energy supplied to that battery during a series charge time period. A series charge time period is the period of time in which all of the batteries in the battery bank are being charged in series by the second power source. The battery charge management system's microcontroller may receive (502) series charge data from each battery in the battery bank according to the method of FIG. 5 by receiving the series charge data using sensors that supply the microcontroller with real-time voltage or current information for each battery. In embodiments of the present invention in which each battery is managed by its own microcontroller, the battery charge management system's microcontroller may receive (502) series charge data from each battery in the battery bank according to the method of FIG. 5 by receiving series charge data from each battery's microcontroller.

The method of FIG. 5 also includes determining (504), by the microcontroller, whether the series charge data received from each battery in the battery bank satisfies series charging termination criteria. Series charging termination criteria specifies when the battery charge management system switches from simultaneously charging all of the batteries in series using the second power source to individually charging each battery using the first power source. Series charging termination criteria may be implemented as a Boolean function having series charge data as an input parameter. If the result of the Boolean function is TRUE, then the series charge data received from each battery in the battery bank satisfies series charging termination criteria. The series charge data received from each battery in the battery bank, however, does not satisfy series charging termination criteria if the result of the Boolean function is FALSE. Readers of skill in the art will note that use of Boolean values is for explanation only and not for limitation.

The method of FIG. 5 includes connecting (506), by the microcontroller, the second power source to the battery bank in series if the series charge data received from each battery in the battery bank does not satisfy series charging termination criteria. The microcontroller may connect (506) the second power source to the battery bank in series according to the method of FIG. 5 using switches controlled by the microcontroller to electrically disconnect the battery bank from the load and electrically connect the battery bank to the second power source.

The method of FIG. 5 also includes connecting (508), by the microcontroller, the plurality of batteries in the battery bank to the first power source if the series charge data received from each battery in the battery bank satisfies series charging termination criteria. The microcontroller may connect (508) the plurality of batteries in the battery bank to the first power source according to the method of FIG. 5 using switches controlled by the microcontroller to electrically disconnect the battery bank from the second power source and electrically connect the battery bank to the first power source.

The method of FIG. 5 also includes the following steps repeatedly (402) for each battery in the battery bank:
  providing (404), by a power source through a multiplexer, power to that battery in the battery bank;
  receiving (406), by the microcontroller, charge data from that battery in the battery bank; and
  switching (408), by the microcontroller, the power provided by the power source to the next battery in the battery bank in dependence upon the discharge data and the charge data for that battery.

Providing (404), by a power source through a multiplexer, power to that battery in the battery bank, receiving (406), by the microcontroller, charge data from that battery in the battery bank, and switching (408), by the microcontroller, the power provided by the power source to the next battery in the battery bank in dependence upon the discharge data and the charge data for that battery according to the method of FIG. 5 by be carried out in the same manner as described above with reference to FIG. 4.

As mentioned above, a single load may be powered by multiple battery banks, each of which may periodically be charged by a battery management system according to embodiments of the present invention. For further explanation, consider FIG. 6 that sets forth a flow chart illustrating a further exemplary method of charging a battery bank that includes a plurality of batteries connected in series according to embodiments of the present invention.

Figure 6:
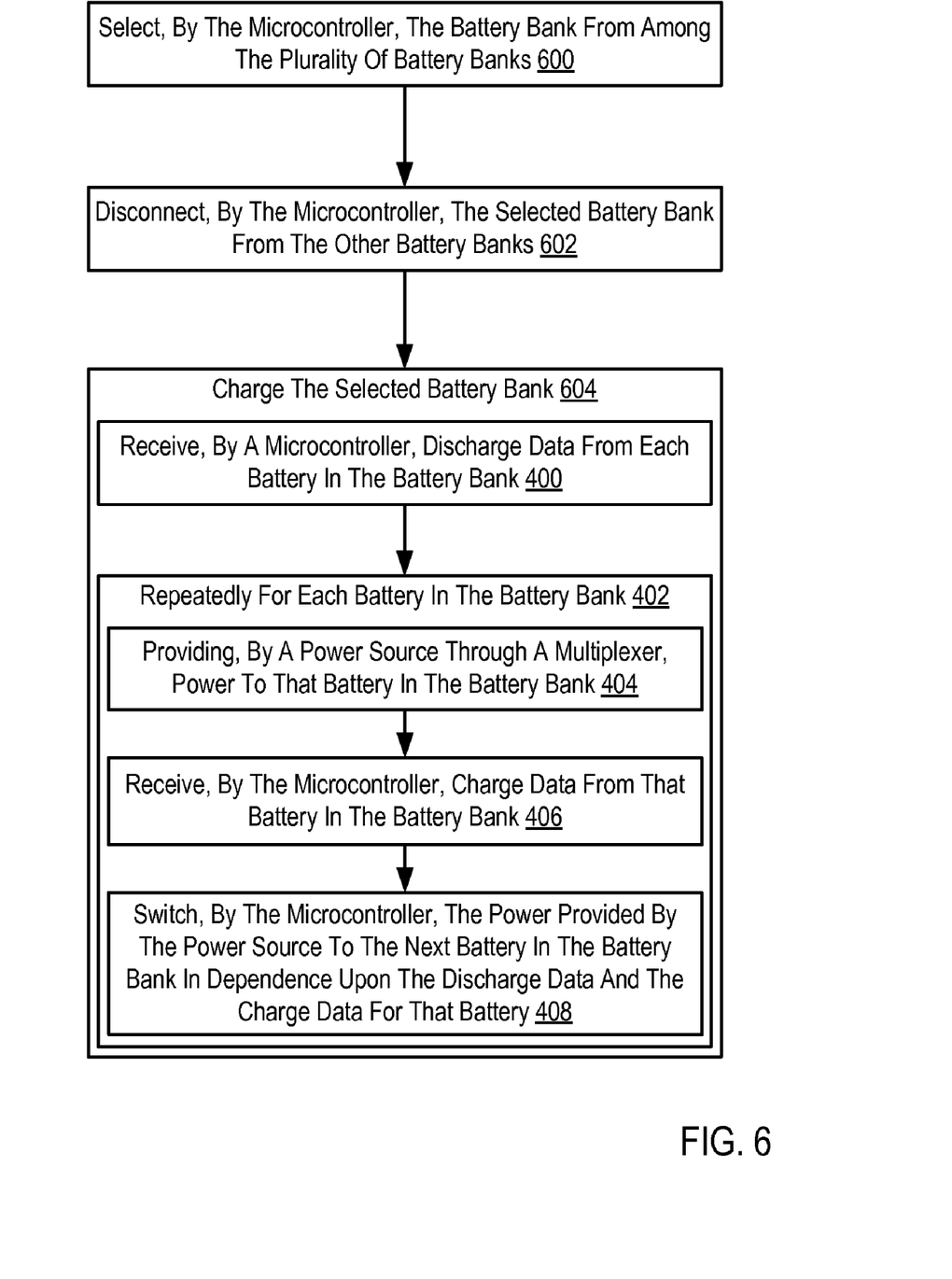
FIG. 6 sets forth a flow chart illustrating a further exemplary method of charging a battery bank that includes a plurality of batteries connected in series according to embodiments of the present invention.

The method of FIG. 6 includes selecting (600), by the microcontroller, the battery bank from among the plurality of battery banks. The microcontroller may select (600) the battery bank from among the plurality of battery banks according to the method of FIG. 6 by identifying the battery bank having dissipated the most energy, by selecting one of the battery banks using a round-robin algorithm, or in any other manner as will occur to those of skill in the art.

The method of FIG. 6 also includes disconnecting (602), by the microcontroller, the selected battery bank from the other battery banks. The microcontroller may disconnect (602) the selected battery bank from the other battery banks according to the method of FIG. 6 using switches controlled by the microcontroller.

The method of FIG. 6 includes charging (604) the selected battery bank. Charging (604) the selected battery bank according to the method of FIG. 6 is carried out by repeatedly (402) for each battery in the battery bank:
  providing (404), by a power source through a multiplexer, power to that battery in the battery bank;
  receiving (406), by the microcontroller, charge data from that battery in the battery bank; and
  switching (408), by the microcontroller, the power provided by the power source to the next battery in the battery bank in dependence upon the discharge data and the charge data for that battery.

Providing (404), by a power source through a multiplexer, power to that battery in the battery bank, receiving (406), by the microcontroller, charge data from that battery in the battery bank, and switching (408), by the microcontroller, the power provided by the power source to the next battery in the battery bank in dependence upon the discharge data and the charge data for that battery according to the method of FIG. 6 by be carried out in the same manner as described above with reference to FIG. 4.

Readers will note that from time to time, one or more of the batteries in a battery bank may generate excessive thermal energy, thereby indicating that there is a problem with the battery. For example, a physical connection for a battery may be loose or a cell failure in a battery may have occurred. As such, a battery charge management system may detect excessive thermal energy and notify a user that excessive thermal energy exists. For further explanation, consider FIG. 7 that sets forth a flow chart illustrating a further exemplary method of charging a battery bank that includes a plurality of batteries connected in series according to embodiments of the present invention.

Figure 7:
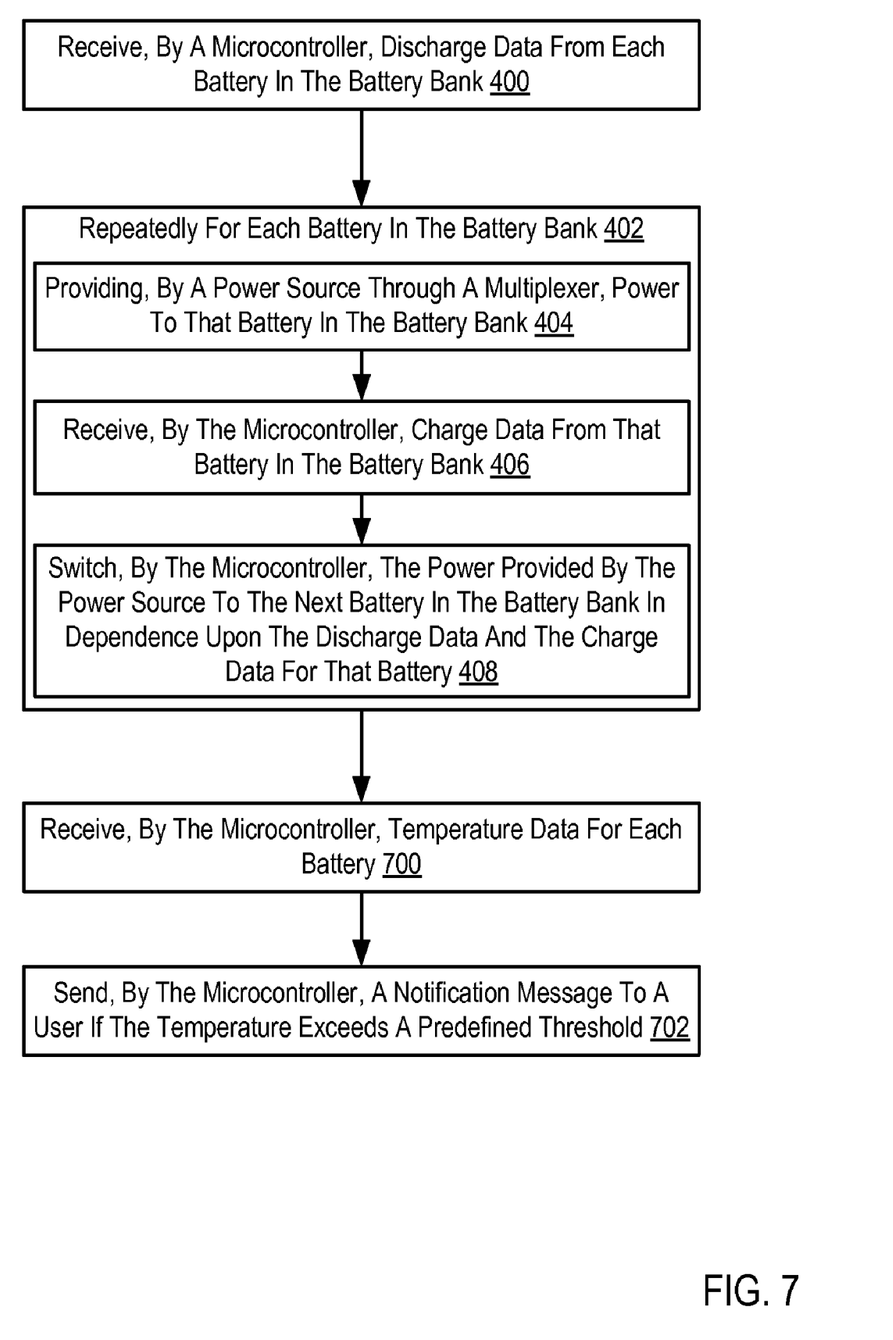
FIG. 7 sets forth a flow chart illustrating a further exemplary method of charging a battery bank that includes a plurality of batteries connected in series according to embodiments of the present invention.

The method of FIG. 7 is similar to the method of FIG. 4. That is, the method of FIG. 7 includes receiving (400), by a microcontroller, discharge data from each battery in the battery bank. The method of FIG. 7 also includes repeatedly (402) for each battery in the battery bank: providing (404), by a power source through a multiplexer, power to that battery in the battery bank; receiving (406), by the microcontroller, charge data from that battery in the battery bank; and switching (408), by the microcontroller, the power provided by the power source to the next battery in the battery bank in dependence upon the discharge data and the charge data for that battery.

The method of FIG. 7 also includes receiving (700), by the microcontroller, temperature data for each battery. Temperature data describes the temperature for each battery—either the temperature of the battery itself or of the ambient environment surrounding each battery. The microcontroller may receive (700) temperature data for each battery according to the method of FIG. 7 by receiving temperature data directly from temperature sensors mounted in or near the battery. In embodiments in which each battery is managed by its own microcontroller, the microcontroller may receive (700) temperature data for each battery according to the method of FIG. 7 by receiving temperature data from each battery's microcontroller, which in turn may receives the temperature data from temperature sensors.

The method of FIG. 7 also includes sending (702), by the microcontroller, a notification message to a user if the temperature exceeds a predefined threshold. The notification message may specify a particular battery and that battery's current temperature. The predefined threshold may be implemented as a temperature value that indicates that a problem with the battery exists. For example, high battery temperatures may indicate that a battery connection is loose or that the battery contains a bad battery cell. The microcontroller may send (702) a notification message to a user according to the method of FIG. 7 through a data communication connection with another computing device, which in turn is capable of rendering the notification message for display to the user on a graphical user interface. The user may then take action based on the information provided by the notification message.

Persons skilled in the art will recognize immediately that, although some of the exemplary embodiments described in this specification are oriented to computer program instructions installed and executing on computer hardware, nevertheless, alternative embodiments implemented as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A battery charge management system for charging a battery bank, the battery bank including a plurality of batteries connected in series, the battery charge management system comprising:
   a first power source having a charging port, the first power source capable of providing power individually to each battery in the battery bank;
   a second power source capable of providing power to the batteries in the battery bank simultaneously in series;
   a multiplexer connected to the battery bank, the multiplexer capable of connecting the charging port to a single battery at a time and capable of switching the connection of the charging port to each battery in the battery bank; and
   a microcontroller connected to the multiplexer and operatively coupled to each battery in the battery bank, the microcontroller capable of:
      receiving discharge data and charge data for each battery in the battery bank;
      in dependence upon the discharge data and charge data, determining whether to charge the batteries individually using the first power source or to simultaneously charge all of the batteries in series using the second power source; and
      instructing the multiplexer to switch the connections of the batteries in the battery bank in dependence upon the determination;
   wherein the microcontroller is capable of determining whether the charge data and discharge data received from each battery in the battery bank satisfies series charging termination criteria, capable of connecting the second power source to the battery bank in series when the charge data and discharge data received from each battery in the battery bank does not satisfy series charging termination criteria, and capable of connecting the plurality of batteries in the battery bank to the first power source when the charge data and discharge data received from each battery in the battery bank satisfies series charging termination criteria.

2. The battery charge management system of claim 1 wherein:
   the battery bank is one battery bank among a plurality of battery banks connected in parallel, each battery bank including a plurality of batteries connected in series;
   the multiplexer is capable of connecting to a single battery bank at a time; and
   the microcontroller is capable of selecting one of the plurality of battery banks, disconnecting the selected battery bank from the remaining battery banks, and switching the connection of the multiplexer to the selected battery bank.

3. The battery charge management system of claim 1 wherein the microcontroller is capable of receiving temperature data for each battery, the temperature data describing temperature for that battery, and sending a notification message to a user when the temperature exceeds a predefined threshold.

4. The battery charge management system of claim 1 wherein the discharge data for each battery represents energy dissipated from that battery during a discharge time period.

5. The battery charge management system of claim 1 wherein the charge data for each battery represents energy supplied to that battery during a charge time period.

6. A method of charging a battery bank that includes a plurality of batteries connected in series, the method comprising:
- receiving, by a microcontroller, discharge data from each battery in the battery bank;
- in dependence upon the discharge data and charge data, determining, by the microcontroller, whether to charge the batteries in the battery bank individually using a first power source or to simultaneously charge all of the batteries in the battery bank in series using a second power source;
- instructing the multiplexer to switch the connections of the batteries in the battery bank in dependence upon the determination;
- providing, by the second power source, second source power to the battery bank in series;
- receiving, by the microcontroller, series charge data from each battery in the battery bank;
- determining, by the microcontroller, whether the series charge data received from each battery in the battery bank satisfies series charging termination criteria;
- connecting, by the microcontroller, the second power source to the battery bank in series when the series charge data received from each battery in the battery bank does not satisfy series charging termination criteria; and
- connecting, by the microcontroller, the plurality of batteries in the battery bank to the first power source when the series charge data received from each battery in the battery bank satisfies series charging termination criteria.

7. The method of claim 6 wherein:
the battery bank is included in a plurality of battery banks connected in parallel; and
the method further comprises:
- selecting, by the microcontroller, the battery bank from among the plurality of battery banks;
- disconnecting, by the microcontroller, the selected battery bank from the other battery banks; and
- charging the selected battery bank.

8. The method of claim 6 further comprising:
- receiving, by the microcontroller, temperature data for each battery, the temperature data describing temperature for that battery; and
- sending, by the microcontroller, a notification message to a user when the temperature exceeds a predefined threshold.

9. The method of claim 6 wherein the discharge data for each battery represents energy dissipated from that battery during a discharge time period.

10. The method of claim 6 wherein the charge data for each battery represents energy supplied to that battery during a charge time period.

11. Apparatus for charging a battery bank that includes a plurality of batteries connected in series, the apparatus comprising:
- means for receiving discharge data from each battery in the battery bank;
- in dependence upon the discharge data and charge data, means for determining whether to charge the batteries in the battery bank individually using a first power source or to simultaneously charge all of the batteries in the battery bank in series using a second power source;
- means for instructing a multiplexer to switch the connections of the batteries in the battery bank in dependence upon the determination;
- means for providing second source power to the battery bank in series;
- means for determining whether the charge data received from each battery in the battery bank satisfies series charging termination criteria;
- means for connecting the second power source to the battery bank in series when the charge data received from each battery in the battery bank does not satisfy series charging termination criteria; and
- means for connecting the plurality of batteries in the battery bank to the first power source when the charge data received from each battery in the battery bank satisfies series charging termination criteria.

12. The apparatus of claim 11 wherein:
the battery bank is included in a plurality of battery banks connected in parallel; and
the apparatus further comprises:
means for selecting the battery bank from among the plurality of battery banks;
means for disconnecting the selected battery bank from the other battery banks; and
means for charging the selected battery bank.

13. The apparatus of claim 11 further comprising:
means for receiving temperature data for each battery, the temperature data describing temperature for that battery; and
means for sending a notification message to a user when the temperature exceeds a predefined threshold.

14. The apparatus of claim 11 wherein the discharge data for each battery represents energy dissipated from that battery during a discharge time period.

15. The apparatus of claim 11 wherein the charge data for each battery represents energy supplied to that battery during a charge time period.

* * * * *